United States Patent
Li et al.

(10) Patent No.: US 11,544,459 B2
(45) Date of Patent: Jan. 3, 2023

(54) METHOD AND APPARATUS FOR DETERMINING FEATURE WORDS AND SERVER

(71) Applicant: Advanced New Technologies Co., Ltd., Grand Cayman (KY)

(72) Inventors: Huaisong Li, Zhejiang (CN); Jianmin Pan, Zhejiang (CN); Xugang Zhou, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/158,899

(22) Filed: Jan. 26, 2021

(65) Prior Publication Data

US 2021/0150142 A1    May 20, 2021

Related U.S. Application Data

(63) Continuation of application No. PCT/CN2019/108024, filed on Sep. 26, 2019.

(30) Foreign Application Priority Data

Nov. 26, 2018  (CN) ......... 201811416994.X

(51) Int. Cl.
  *G06F 40/279*  (2020.01)
  *G06F 16/31*   (2019.01)
  *G06F 40/166*  (2020.01)

(52) U.S. Cl.
  CPC ........ *G06F 40/279* (2020.01); *G06F 16/313* (2019.01); *G06F 40/166* (2020.01)

(58) Field of Classification Search
  CPC ..... G06F 40/279; G06F 16/313; G06F 40/166
  (Continued)

(56) References Cited

U.S. PATENT DOCUMENTS 6,374,210 B1 *  4/2002  Chu ............... G06F 40/53
                                           704/9
8,023,974 B1 *  9/2011  Diao .............. H04L 51/12
                                           709/200

(Continued)

FOREIGN PATENT DOCUMENTS

CN    102411568 A    4/2012
CN    103678371 A    3/2014

(Continued)

OTHER PUBLICATIONS

Wu, "A Quick Word Segmentation Technology Research and Application—the Method of Extracting New Word," *Software Engineer.* 18(12):64-68, 2015.

(Continued)

*Primary Examiner* — Andrew R Dyer
*Assistant Examiner* — Tionna M Burke
(74) *Attorney, Agent, or Firm* — Seed IP Law Group LLP

(57) ABSTRACT

The present specification provides a method and apparatus for determining feature words and a server. The method includes: obtaining text data; extracting a first feature word from the text data; updating a word segmentation library based on the first feature word to obtain an updated word segmentation library, the word segmentation library including a plurality of predetermined feature words for representing predetermined attribute types; and extracting a second feature word from the text data based on the updated word segmentation library and the predetermined feature words.

20 Claims, 6 Drawing Sheets

(58) Field of Classification Search
USPC .......................................................... 715/256
See application file for complete search history.

(56) References Cited

U.S. PATENT DOCUMENTS

| | | | |
|---|---|---|---|
| 9,189,746 B2* | 11/2015 | Zhu | G06F 21/552 |
| 2010/0088303 A1* | 4/2010 | Chen | G06F 16/36 |
| | | | 707/706 |
| 2018/0267957 A1 | 9/2018 | Lee et al. | |

FOREIGN PATENT DOCUMENTS

| | | |
|---|---|---|
| CN | 106095736 A | 11/2016 |
| CN | 106202056 A | 12/2016 |
| CN | 107357785 A | 11/2017 |
| CN | 107515849 A | 12/2017 |
| CN | 108021558 A | 5/2018 |
| CN | 108319582 A | 7/2018 |
| CN | 110020422 A | 7/2019 |
| JP | 2013-134752 A | 7/2013 |
| JP | 2014-56331 A | 3/2014 |

OTHER PUBLICATIONS

Cao et al.,"cw2vec: Learning Chinese Word Embeddings with Stroke n-gram Information," *The 32nd AAAI Conference on Artificial Intelligence (AAAI*-18). 2018.

* cited by examiner

ME THOD AND APPARATUS FOR
DETERMINING FEATURE WORDS AND
SERVER

BACKGROUND

Technical Field

The present specification pertains to the technical field of Internet, and in particular, to a method and apparatus for determining feature words and a server.

Description of the Related Art

During supervision of a network transaction, an attribute type of the transaction is often determined by searching for feature words (such as phrases that can reflect the commonality of network transactions of a certain attribute type) in text data included in data related to the network transactions, so that the network transactions of a certain attribute type can be properly monitored and managed.

For example, it is determined whether network transactions are illegal transactions by searching and identifying whether the text data related to the network transaction includes black words (feature words representing illegal transactions) such as " 上分 " and " 下分 " in Chinese. As such, illegal transactions can be identified and handled in time.

When the attribute types of network transactions are determined by using the above method, whether the feature words used are accurate and whether the coverage is comprehensive have a great impact on the accuracy in determining the attribute types of the network transactions. In addition, as people's language habits and wording ways change, feature words that can effectively represent the commonness of the same attribute type of network transactions also change. For example, some new phrases may appear as feature words to represent this attribute type of transactions. Therefore, there is an urgent need for a method that can accurately determine feature words used to represent an attribute type of a network transaction.

BRIEF SUMMARY

The present specification provides a method and apparatus for determining feature words and a server. The techniques have technical advantages so as to, among others, avoid inaccurate and incomplete feature word extraction caused by a word segmentation error during extraction of a second feature word, and achieve the technical effect of accurately and efficiently identifying new feature words meeting requirements from text data.

A method and apparatus for determining feature words and a server according to the present specification are implemented as follows.

A method for determining feature words includes: obtaining text data; extracting a first feature word from the text data; updating a word segmentation library based on the first feature word to obtain an updated word segmentation library, the word segmentation library including a plurality of predetermined feature words for representing predetermined attribute types; and extracting a second feature word from the text data based on the updated word segmentation library.

An apparatus for determining feature words includes: an acquisition module, configured to obtain text data; a first extraction module, configured to extract a first feature word from the text data; an update module, configured to update a word segmentation library based on the first feature word to obtain an updated word segmentation library, the word segmentation library including a plurality of predetermined feature words for representing predetermined attribute types; and a second extraction module, configured to extract a second feature word from the text data based on the updated word segmentation library.

A server includes a processor and a memory for storing instructions executable by the processor, where when the processor executes the instructions, the following is implemented: obtaining text data; extracting a first feature word from the text data; updating a word segmentation library based on the first feature word to obtain an updated word segmentation library, the word segmentation library including a plurality of predetermined feature words for representing predetermined attribute types; and extracting a second feature word from the text data based on the updated word segmentation library.

A computer-readable storage medium stores computer instructions, where when the instructions are executed, the following is implemented: obtaining text data; extracting a first feature word from the text data; updating a word segmentation library based on the first feature word to obtain an updated word segmentation library, the word segmentation library including a plurality of predetermined feature words for representing predetermined attribute types; and extracting a second feature word from the text data based on the updated word segmentation library.

In the method and apparatus for determining feature words and the server according to the present specification, a new word is extracted from the text data to obtain a first feature word; then the word segmentation library is updated by using the first feature word; and further, a new feature word is extracted from the text data as the second feature word by using the updated word segmentation library and the predetermined feature words, thereby avoiding inaccurate and incomplete feature word extraction caused by a word segmentation error in a process of extracting feature words, and achieving the technical effect of accurately identifying new feature words meeting requirements from the text data.

BRIEF DESCRIPTION OF THE SEVERAL VIEWS OF THE DRAWINGS

To describe the technical solutions in the implementations of the present specification or in the existing technologies more clearly, the following briefly describes the accompanying drawings needed for describing the implementations or the existing technologies. Clearly, the accompanying drawings in the following descriptions merely show some implementations of the present specification, and a person of ordinary skill in the art can still derive other drawings from these accompanying drawings without making innovative efforts.

DETAILED DESCRIPTION

Figure 1:
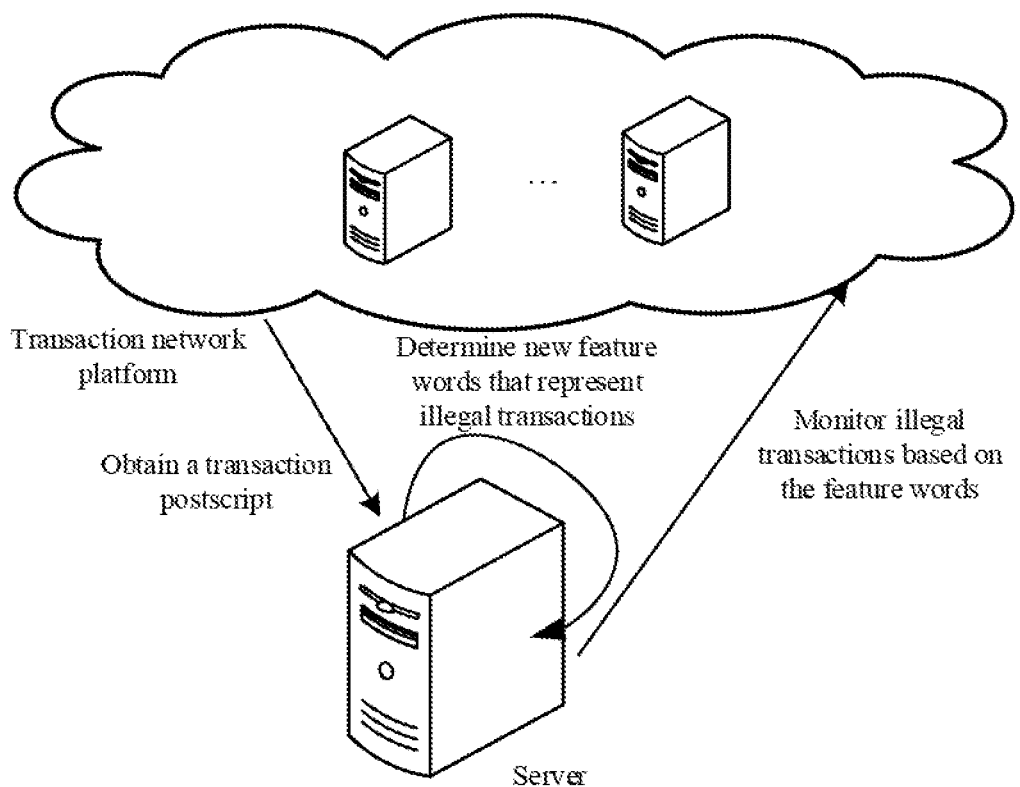
FIG. 1 is a schematic diagram illustrating the application, in an example scenario, of implementations of a method for determining feature words according to implementations of the present specification.

To make a person skilled in the art better understand the technical solutions in the implementations of the present specification, the following clearly and completely describes the technical solutions in the implementations of the present specification with reference to the accompanying drawings in the implementations of the present specification. Clearly, the described implementations are merely some but not all of the implementations of the present specification. Based on the implementations of the present specification, all other implementations derived by a person of ordinary skill in the art without making innovative efforts shall fall within the protection scope of the present specification.

The existing method for determining feature words usually includes: directly performing word segmentation on obtained text data; obtaining a word segmentation vector by using a deep learning algorithm; calculating a vector distance between the word segmentation vector and the existing feature words by using a semantic vector distance, PageRank or other methods; and finally determining new feature words based on the vector distance.

However, phrases used in the field of Internet change rapidly. For example, a large number of new words may appear on the Internet every one or two days. However, the existing method as identified above is not capable of taking into account the influence of similar new words, which leads to errors of splitting new word combinations in the word segmentation. As a result, real vectors of new words cannot be obtained, making it difficult to detect new feature words.

In view of the above situation, the present specification combines identification of new words and determination of feature words. Specifically, a new word in obtained text data can be identified and extracted as a first feature word; then a word segmentation library including existing predetermined feature words is updated based on the first feature word; word segmentation is performed on the text data based on the updated word segmentation library, and a new feature word is determined based on a vector of a word segmentation result with reference to the predetermined feature words, that is, a second feature word is identified. This avoids inaccurate feature word extraction caused by a word segmentation error during extraction of the second feature word, and achieves the technical effect of accurately identifying new feature words meeting requirements from the text data.

The implementations of the present specification provide a system architecture in which the method for determining feature words according to the present specification can be applied. The system can include a server, and the server can be connected to a business system of a network platform to obtain text data on the network platform; then extract a first feature word from the text data; update a word segmentation library based on the first feature word to obtain an updated word segmentation library; and extract a second feature word from the text data based on the updated word segmentation library and the predetermined feature words, that is, identify a new feature word.

In implementations, the server can be a backend server that can implement data acquisition, data processing and other functions. Specifically, the server can be an electronic device with a data computation and storage function and a network interaction function; or the server can be a software program that runs in the electronic device to support data processing, storage and network interaction. In implementations, the number of the servers is not limited. The servers can be one server, or several servers, or a server cluster.

In an example scenario, as shown in FIG. 1, the method for determining feature words according to implementations of the present specification can be used to analyze and process in detail relevant text data obtained from a certain transaction network platform, and extract therefrom new feature words that can be used to indicate illegal transactions, so that illegal transactions on the transaction network platform can be subsequently identified in time based on the new feature words, and monitored and handled in time.

Figure 2:
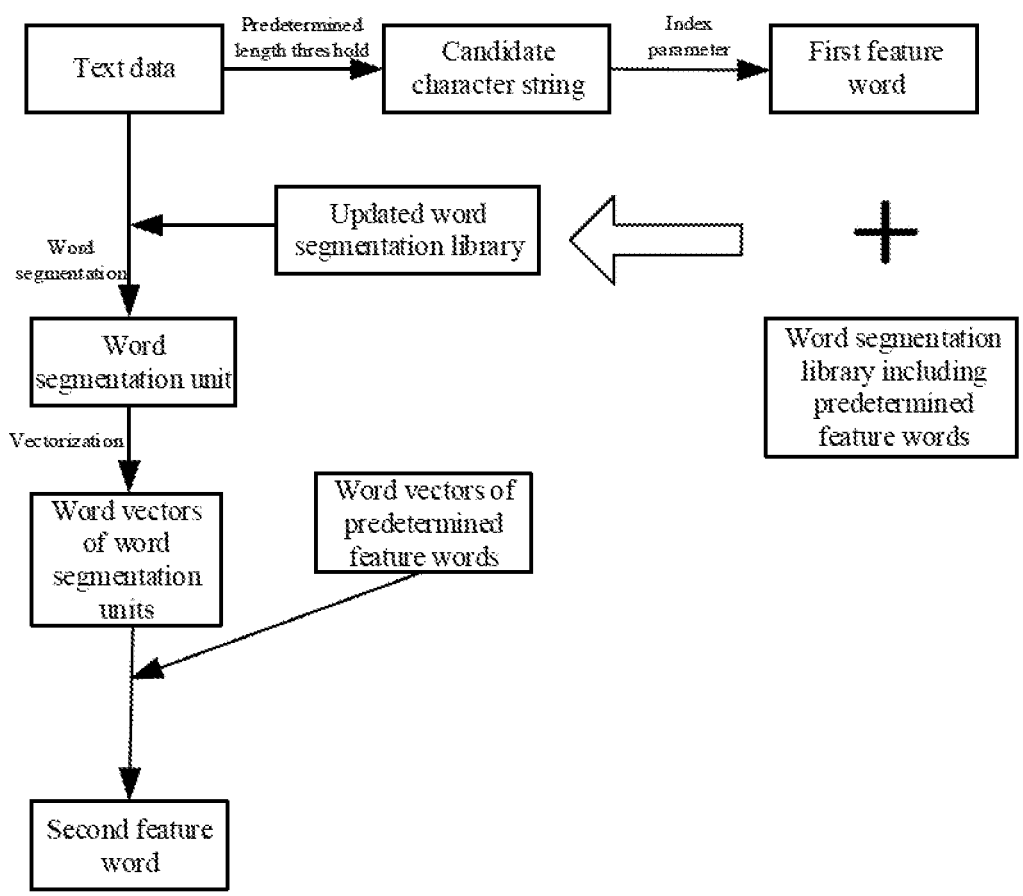
FIG. 2 is a schematic diagram illustrating the application, in an example scenario, of implementations of a method for determining feature words according to implementations of the present specification.

In the example scenarios, in specific implementations, as shown in FIG. 2, the server can first collect a transaction postscript, etc., included in network transaction data (such as transfer data) of, e.g., the past week on the transaction network platform as text data. The above transaction network platform can be a shopping website, a wealth management website, a payment platform, etc. For example, in an example platform where Chinese is the main language, the text data used usually includes a large number of Chinese characters.

The above text data can be understood as data including information such as Chinese characters, English letters, Chinese phonetic symbols or numbers on a transaction network platform. Specifically, the above text data can include a transaction postscript, or can include a text label, etc. Certainly, the transaction postscript and text label listed above are only used for better describing the implementations of the present specification. In specific implementation, the above text data can also include other types or forms of data based on specific application scenarios and use requirements. This is not limited in the present specification.

The above transaction postscript can be understood as information data which is customized and edited by a transaction data initiator to describe relevant characteristics of the transaction data. Specifically, when sending transaction data, the transaction data initiator can input or set, through a predetermined text data input interface, feature information such as transaction purpose, transaction time or transaction object used to describe the transaction data as a transaction postscript. For example, when user A makes XX payment of 10 yuan to user B through a transaction network platform, before confirming the sending of the transaction data, user A can enter "XX payment" as a transaction postscript in a predetermined message interface to represent that the transaction purpose of the transaction data is to make XX payment, and then the transaction network platform will send the above transaction postscript together with the transaction data to user B so that user B can know the transaction purpose corresponding to the received transaction data.

The above text label can be understood as a data label that is collected by the transaction network platform and is automatically generated, based on the operation related to the transaction data implemented by the transaction data initiator, to describe the type, purpose or content of the transaction data. For example, user C clicks on a loan repayment option in an operation interface, and enters "5000 yuan" in a displayed next-level interface to initiate transaction data. The transaction network platform can determine, based on the above operation performed by user C, that the purpose of this data is to repay the loan, so it can automatically generate "loan repayment" as a text label and add the label to this transaction data for recording.

After obtaining the above text data, the server can first identify new words from the above text data. Specifically, the above text data can be analyzed and processed by using a new word discovery algorithm, and a new word can be extracted therefrom as a first feature word.

The above first feature word can be understood as a new word, e.g., a specific language character combination that has not been identified by the server before and has not been recorded in a database or a word segmentation library of the server.

It should be noted that the Internet fields are different from other technical fields, and knowledge information in the Internet field is updated relatively quickly and frequently. For example, a large number of new network words that can represent some specific semantics may appear every one or two days. Based on the existing methods for determining feature words, the influence of the above new words is often ignored, that is, a word segmentation library may not be updated in time with the new words, and an error may easily occur in subsequent word segmentation. For example, some new Chinese character combinations are incorrectly split, which affects the subsequent semantic determination, resulting in errors or incompleteness of finally determined feature words.

For example, the Chinese character combination "狗带" is a new network word. If the word is not stored in the previous word segmentation library, it is very likely that the word will be incorrectly split into "狗" and "带" in subsequent word segmentation based on the original word segmentation library, which will lead to an error in the semantic determination of this word, and then affect the subsequent determination of feature words.

In the present specification, considering the above characteristics in the Internet fields, before feature words are determined, a new word is determined from text data first to obtain a first feature word; then a word segmentation library can be updated subsequently with the first feature word, and more accurate word segmentation is performed based on the updated word segmentation library.

In specific implementations, the server can select character strings with a character length less than a predetermined length threshold (for example, a length of 5 characters) from the text data as candidate character strings; calculate index parameters of each character string of the candidate character strings; and extract, based on the index parameters, a candidate character string meeting a first predetermined threshold from the candidate character strings as a new word, e.g., a first feature word.

Specifically, for example, considering a habit of word formation in Chinese, the character length of a phrase is usually relatively short. Therefore, based on the character length, character strings that obviously do not conform to the habit of word formation and have a high probability of failing to form a phrase can be firstly filtered out from the text data to obtain candidate character strings. In the example scenarios, the predetermined length threshold can be set to a length of 5 characters, so that character strings with a character length greater than 5 characters can be filtered out first, so as to reduce the subsequent workload and improve the processing efficiency. It should be noted that the predetermined length threshold listed above is merely illustrative. In specific implementations, other values can also be preset as the length thresholds based on specific scenarios. This is not limited in the present specification.

In the example scenarios, after the character strings with a character length less than the predetermined length threshold are selected from the text data, character strings included in the existing database can be further filtered out from the selected character strings, and the character strings obtained after the filtering are used as candidate character strings. As such, the candidate character strings do not include character strings corresponding to existing phrases.

An index parameter can be understood as a feature parameter for representing whether a character string can construct a phrase. Generally, if the index parameter of a candidate character string meets certain requirements, the character string can form a phrase, such as forming a new word.

In the example scenarios, the index parameter can include at least one of a coagulation degree, information entropy, frequency, etc. Certainly, it should be noted that the index parameters listed above are only illustrative examples used for better describing the implementations of the present specification. In specific implementations, other types of feature parameters can also be used as the index parameters based on specific scenarios. This is not limited in the present specification.

The above coagulation degree can be understood as the probability that characters included in the character string in the text data are combined together. Generally, when a character string has a higher coagulation degree, the character string has a higher probability of becoming a phrase. For example, if it is found through calculation that the coagulation degree of the Chinese character string "电影院" is higher than that of the Chinese character string "的电影", it can be determined that the character string "电影院" has a higher probability of becoming a word than "的电影".

When the coagulation degree of a character string is calculated, the probability of the whole character string occurring in text data and the probability various split combinations of the character string occurring in the text data can be calculated first respectively; then the ratio of the probability the whole character string occurring in the text data to the probability of the various split combinations of the character string occurring in the text data is calculated; and finally, the ratio with the minimum value is determined as the coagulation degree of the character string.

For example, when the coagulation degree of the Chinese character string "电影院" is calculated, the probability of the Chinese character string "电影院" occurring in the text data can be first calculated as p0=p(电影院). The Chinese character string "电影院" can be split into two split combinations: a first split combination: "电" and "影院", and a second split combination: "电影" and "院". The probabilities of the two split combinations occurring in the text data are calculated respectively. For example, during determining of the probability of occurrence of the first split combination, the probability of the Chinese character "电" occurring in text data and the probability of the Chinese character "影院" occurring in the text data can be first calculated respectively; and then the product of the above two probabilities is used as the probability of the first split combination occurring in the text data, which can be expressed as: p1=p(电)*p(影院).

Similarly, the probability of the second split combination occurring in the text data can be calculated as p2=p(电影)* p0(院). Then the ratios p0/p1 p0/p2 are calculated respectively. The values of p0/p1 and p0/p2 are calculated, and p0/p2 with a smaller value is determined as the coagulation degree of the character string "电影院". Although Chinese character string is used as illustrative examples for descriptive purposes, the techniques can be similarly used or applied with respect to other languages.

The above information entropy can also be called degree of freedom, which can be understood as the probability of occurrence of certain specific information represented by a character string. Usually, when the probability of occurrence of certain specific information represented by a character string is high, it indicates that it has been propagated widely, or the degree of being quoted is relatively higher. In the specification, the information entropy of a character string may be used to determine the randomness of left adjacent word set and right adjacent word set of the character string, so that such index parameter can be used to reflect the amount of information included in the character string as a character string and its usage frequency.

When the information entropy is calculated, the text data can be searched to determine left adjacent word(s) and right adjacent word(s) of the character string, and then the probability of occurrence of each left adjacent word and the probability of occurrence of each right adjacent word are calculated respectively; information entropy of each left adjacent word is calculated by using a determined, predetermined or dynamically determined, equation based on the probability of occurrence of the left adjacent word, and information entropy of each right adjacent word is calculated based on the probability of occurrence of the right adjacent word.

For example, for example Chinese text data "吃葡萄不吐葡萄皮不吃葡萄倒吐 葡萄皮", when information entropy of the Chinese character string "葡萄" is calculated, the text data can be first searched to identify that left adjacent word(s) of the Chinese character string "葡萄" are: "吃", "吐", "吃" and "吐", and right adjacent word(s) of the character string "葡萄" are "不", "皮", "倒" and "皮". Then the probability of occurrence of each left adjacent word is calculated as follows: ½ for p(吃), and ½ for p(吐); and the probability of occurrence of each right adjacent word is as follows: ¼ for p(不), ¼ for p(倒), and ½ for p(皮). Then the information entropy of each left adjacent word is calculated by using the following determined equation $H(x)=-\Sigma p(x_i)\log(p(x_i))$ based on the probability of occurrence of the left adjacent word. Specifically, it can be expressed as $-(½)\cdot\log(½)-(½)\cdot\log(½)\approx 0.693$. Similarly, information entropy of each right adjacent word can be obtained as $-(½)\cdot\log(½)-(¼)\cdot\log(¼)-(¼)\cdot\log(¼)\approx 1.04$ based on the probability of occurrence of the right adjacent word. By comparing the information entropy of the left adjacent word with that of the right adjacent word, it can be found that the value of the information entropy of the right adjacent word is greater for the character string "葡萄", so the character string can be connected to more right adjacent words.

The above frequency can be understood as the number of times a character string occurs in text data. Generally, when a character string has a higher frequency, the character string has a higher probability of becoming a phrase. Specifically, for example, when the Chinese character string "机器" occurs 180 times, the frequency of the character string "机器" can be determined as 180.

After the index parameters such as the coagulation degree, the information entropy and the frequency of each candidate character string are calculated, e.g., in the above way, the coagulation degree, the information entropy and the frequency of each candidate character string can be further compared with a predetermined coagulation degree threshold, a predetermined information entropy threshold and a predetermined frequency threshold, respectively, and the candidate character string with the coagulation degree less than or equal to the predetermined coagulation degree threshold, the information entropy less than or equal to the predetermined information entropy threshold and/or the frequency less than or equal to the predetermined frequency threshold is determined as a first feature character string meeting a first predetermined threshold, e.g., a new word.

In the example scenarios, the specific values of the predetermined coagulation degree threshold, the predetermined information entropy threshold and the predetermined frequency threshold can be flexibly or dynamically set based on specific scenarios and processing requirements. This is not limited in the present specification.

After determining the above first feature word based on the text data, the server can further update a word segmentation library based on the above first feature word to obtain an updated word segmentation library.

The above word segmentation library can be understood as a word library established based on historical data and including a plurality of predetermined feature words for representing predetermined attribute types. The above predetermined attribute types can specifically include: legal types, illegal types, etc. The legal types can be further divided into repayment, consumption, lending and other types. Similarly, the illegal types can be further divided into many types. The above predetermined feature word can be understood as an existing phrase (or an existing word) that can be used to represent a predetermined attribute type.

In the example scenarios, considering that the applied transaction network platform is a transaction network platform using Chinese, and word segmentation is mainly performed on Chinese text data, jieba (a word segmentation library based on a hidden Markov model (HMM)) can be used as the above word segmentation library. Because jieba has good matching for Chinese character phrases, using jieba as the word segmentation library in this example scenario can make the subsequent word segmentation more accurate. Certainly, it should be noted that jieba listed above is merely illustrative. In specific implementation, other types of word segmentation libraries can be selected based on specific application scenarios and types of languages used. This is not limited in the present specification.

In the example scenarios, the purpose is to identify new feature words for illegal transactions, and therefore predetermined attribute types are illegal types. Corresponding predetermined feature words are existing phrases that can represent illegal types. Specifically, for example, Chinese words "上分" and "下分" are common keywords associated with illegal transactions. Therefore, the above two phrases can be predetermined feature words included in the word segmentation library.

In specific implementation, the newly determined first feature word, e.g., the new word, can be added to the existing word segmentation library, so as to update and expand the existing word segmentation library and obtain a more complete and accurate updated word segmentation library including currently newly identified new words. As such, the obtained updated word segmentation library includes the new words that have just appeared. Therefore, when the updated word segmentation library is used subsequently to replace the existing word segmentation library for word segmentation, it can solve the problem that some new words not recorded in the existing word segmentation library are incorrectly split due to the use of the existing word segmentation library.

After the above more accurate and complete word segmentation library is obtained, the server can extract a second feature word from the text data based on the above updated word segmentation library, e.g., a new feature word for representing the predetermined attribute type.

A second feature word can be understood as a new phrase that is different from the predetermined feature word, has not been identified and determined by the server before, and can represent the predetermined attribute type.

In specific implementations, word segmentation can be performed on the text data based on the updated word segmentation library to obtain a plurality of word segmentation units; then word vectorization is respectively performed on the plurality of word segmentation units to obtain word vectors of the word segmentation units; and based on the word vectors of the word segmentation units and word vectors of the predetermined feature words, a word segmentation unit meeting a second predetermined threshold is determined among the plurality of word segmentation units as the second feature word.

In the example scenarios, because word segmentation is performed on the text data by using the word segmentation library updated based on the first feature words, it can be avoided that some new words are incorrectly split, so that the word segmentation units obtained by the word segmentation are more accurate.

After the word segmentation units are obtained, in specific implementation, they can be respectively vectorized to obtain word vectors that can represent semantics of the word segmentation units; then, based on the word vectors of the above word segmentation units and the word vectors of the predetermined feature words, the word segmentation units that meet the second predetermined threshold (e.g., the semantics are relatively close to the predetermined feature words, and the represented attribute types are similar) can be identified from the word segmentation units as the second feature words.

In the example scenarios, the transaction network platform is based on Chinese. Chinese characters are different from English letters. English letters are phonetic words, that is, a single English letter only represents pronunciation, not semantics. Chinese characters are both phonetic and ideographic characters (such as pictophonetic characters and pictographic characters), in addition to representing the pronunciation of a single Chinese character, the structure of the Chinese character itself (such as the composition of the strokes within the Chinese character) can also, to a certain extent, reflect the semantics.

For Chinese language text, the existing vectorization of word segmentation units usually vectorizes Chinese character units by using a PageRank method (a word vectorization algorithm). However, the PageRank method itself is designed based on the characteristics of English letters. The word vector obtained by this method can reflect only external context information of words, and cannot reflect semantic information included in the internal structures of Chinese characters. Therefore, the information included in the word vectors which are obtained by performing, by using the PageRank method, vector processing on word segmentation units composed of Chinese characters often misses semantic information represented by the internal structure of Chinese characters in the word segmentation units, that is, the information is incomplete and inaccurate, which will affect the subsequent extraction of the second feature word.

In view of the above problems, to make the word vectors of the obtained word segmentation units include richer and more complete information, and to further improve the accuracy of determining the second feature word, in the example scenarios, word vectorization can be performed on each word segmentation unit of a plurality of word segmentation units in the following way. Specifically, the server can first split the Chinese characters in the word segmentation unit into a plurality of strokes; map different strokes to different numerical values, and establish a stroke vector of the word segmentation unit based on the plurality of strokes of the word segmentation unit; search for and obtain words (such as left adjacent words and right adjacent words) connected to the word segmentation unit in the text data as context words; obtain word vectors of the context words by using a suitable method; and determine the word vector of the word segmentation unit based on the stroke vector of the word segmentation unit and the word vectors of the context words. The word vector of the word segmentation unit obtained in this way includes contextual external information of the word segmentation unit, and includes semantic information reflected by the internal structure of Chinese characters in the word segmentation unit, so that the obtained word vector of the word segmentation unit is more accurate and complete.

Certainly, the ways of obtaining word vectors of the word segmentation units listed above are merely illustrative. In specific implementation, the word vectors of the word segmentation units can alternatively be obtained by performing word vectorization on the plurality of word segmentation units by using a Cw2vec algorithm (learning Chinese word embedding with stroke n-gram information, a word vectorization algorithm). This is not limited in the present specification.

After the word vectors of the above word segmentation units are obtained, further, the server can determine, based on the word vectors of the word segmentation units and word vectors of the predetermined feature words, a word segmentation unit that meets a second predetermined threshold (e.g., it is required to be close to the semantics of the predetermined feature words or the represented attribute type) from the plurality of word segmentation units as a second feature word, that is, a new feature word that can represent the predetermined attribute type is obtained.

In the example scenarios, in specific implementations, a predetermined number of predetermined feature words can be extracted from a plurality of predetermined feature words as test words (also called spy); based on the word vectors of the predetermined feature words except for the test words in the plurality of predetermined feature words, a labeled sample set (also called black samples, positive, denoted as p) is established, and the word vectors of word segmentation units in the sample set are marked as 1; based on the word vectors of the test words and the word vectors of the word segmentation units, an unlabeled sample set (which can also be called white samples, defined as unlabeled and denoted as U) is established, and the word vectors of the word segmentation units in the sample set are marked as 0. It should be noted that the number of samples in the above labeled sample set is less than that of samples in the unlabeled sample set.

After the above labeled sample set and unlabeled sample set are established, a fitting score threshold is determined through a plurality of iterative fittings based on the labeled sample set and the unlabeled sample set.

Specifically, the fitting score threshold can be determined as follows: performing gradient boosting decision tree (GBDT) fitting on the word vectors of word segmentation units in the labeled sample set and the unlabeled sample set, and scoring the word vector of each word segmentation unit based on fitting results (denoted as score); and processing the scores of the fitting results: setting the scores of the word vectors of the word segmentation units belonging to P to 1, keeping the original scores of the rest, and then performing normalization. The above steps are repeated many times (for example, twice) until a threshold (denoted as t) which enables the word vectors (e.g., spy) of the predetermined feature words classified in U and with a threshold ratio (for example, 90%) to be identified is found as the above fitting score threshold.

After the fitting score threshold is determined, a word segmentation unit corresponding to a word segmentation unit vector that meets the second predetermined threshold can be further determined among the word segmentation unit vectors as the second feature word based on the above fitting score threshold.

Specifically, the second feature word can be determined as follows: reclassifying the word vectors (e.g., spy) of the predetermined feature words classified in U back to P; then assigning scores "0" to word vectors of all remaining word segmentation units in U and with fitting score values less than the fitting score threshold (e.g., t), assigning scores "1" to word vectors of all predetermined feature words in P, keeping the current scores of the rest of word vectors, and then performing normalization; then performing GBDT fitting on all word vectors, and scoring the word vector of each word again based on the fitting results to obtain a fitting score, which is recorded as score; based on the fitting score, setting the fitting score' of the word vector belonging to P to 1, keeping the original score' of the rest of word vectors, and then performing normalization. The above steps are repeated many times (for example, 5 times) to obtain the final fitting score of each word vector, which is denoted as score", and the word segmentation unit corresponding to the word vector whose score" is greater than the feature word score threshold (denoted as v) is determined as the second feature word, e.g., a new phrase that can represent the attribute type and meets the second predetermined threshold. The above feature word score threshold can be set based on specific scenarios and accuracy requirements. The specific value of the feature word score threshold is not limited in the present specification.

Certainly, the ways of determining the second feature word listed above are merely illustrative. In specific implementation, the word vectors of the plurality of word segmentation units can also be analyzed and processed by using a PU_learning algorithm (learning from positive and unlabeled examples) to determine the second feature word. This is not limited in the present specification.

In the example scenarios, in specific implementations, the feature word score threshold can be set to 0.5, and then the segmentation unit that can represent illegality and meet the second predetermined threshold can be gradually determined among a plurality of segmentation units, according to the above processing steps, as the second feature word, e.g., the new feature word.

After the new feature word that can represent illegal transactions (e.g., the second feature word), is determined based on the above way, the server can further merge the second feature word with the predetermined feature word; and detect and identify text data such as a transaction postscript and a text label on the transaction network platform based on the merged feature words, so as to identify illegal transactions on the transaction network platform in time and perform targeted monitoring and processing on the illegal transactions.

It can be seen from the above example scenario that in the method for determining feature words according to the present specification, a new word is extracted from the text data to obtain a first feature word; then the word segmentation library is updated by using the first feature word; and further, a new feature word is extracted from the text data as the second feature word by using the updated word segmentation library and the predetermined feature words, thereby avoiding inaccurate feature word extraction caused by a word segmentation error during extraction of feature words, and achieving the technical effect of accurately identifying new feature words meeting requirements from the text data.

Figure 3:
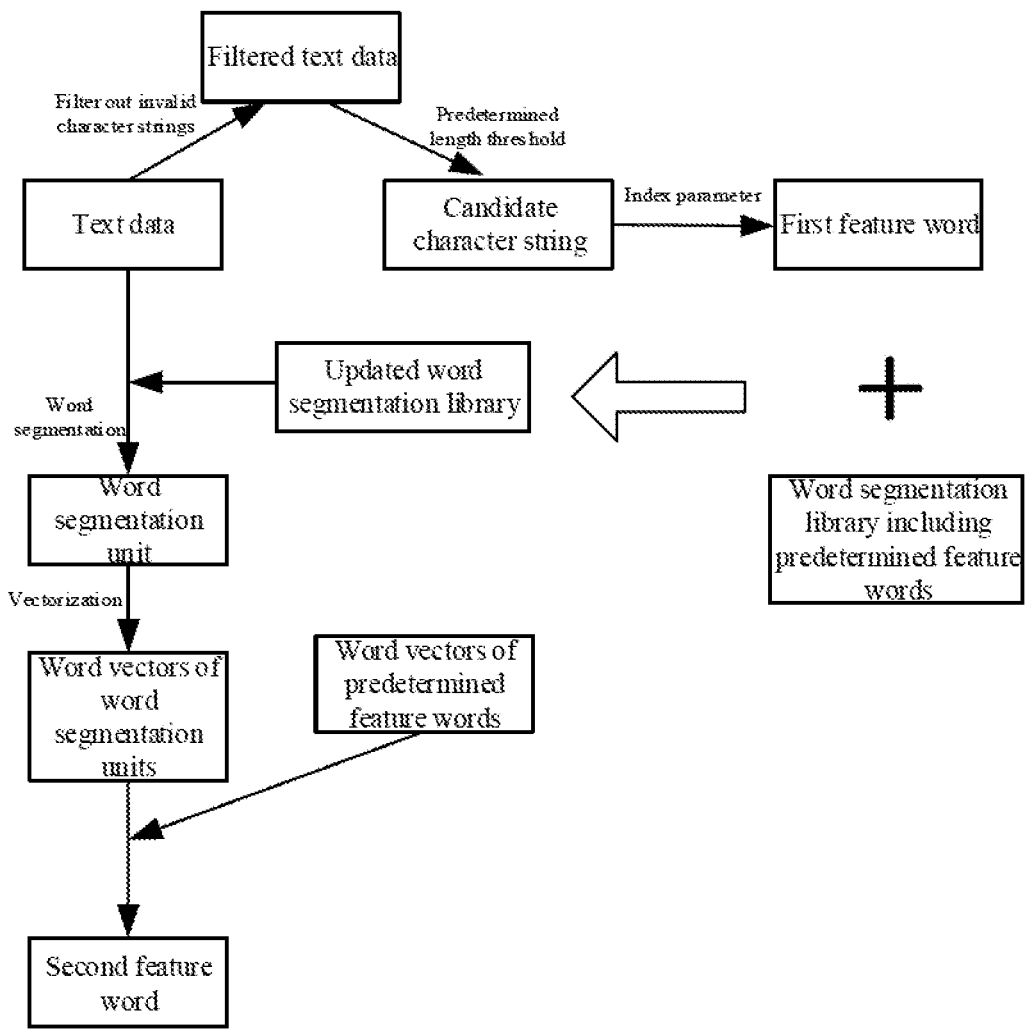
FIG. 3 is a schematic diagram illustrating the application, in an example scenario, of implementations of a method for determining feature words according to implementations of the present specification.

In some example scenarios, to avoid the interference by some meaningless character strings, reduce the subsequent workload and improve processing efficiency, referring to FIG. 3 in specific implementations, before the selecting, from the text data, one or more character strings each with a character length less than the predetermined length threshold as one or more candidate character strings, the method can further include the following steps: filtering out invalid character strings from the text data to obtain filtered text data, and selecting character strings with a character length less than the predetermined length threshold from the filtered text data as candidate character strings.

In example scenarios, the invalid character string can be understood as a character string that does not include Chinese characters or obviously does not constitute a phrase. Specifically, the above invalid character string can be a character string composed entirely of letters, numbers or emoticons, or a web page link, or text data used to represent the transformation from traditional Chinese to simplified Chinese, etc. Certainly, it should be noted that the above invalid character string listed above is merely illustrative. In specific implementation, the above invalid character string can also include other types of character strings based on specific application scenarios. This is not limited in the present specification.

Figure 4:
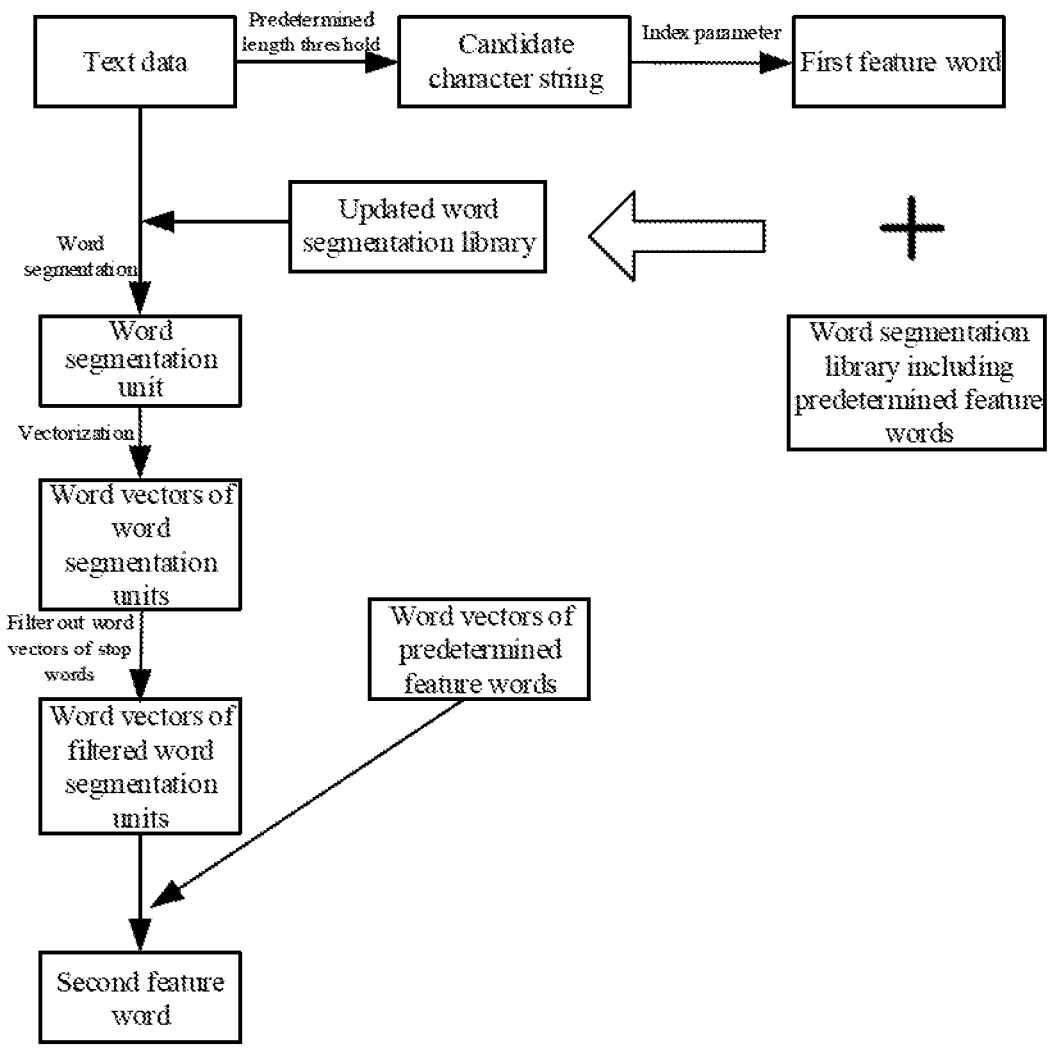
FIG. 4 is a schematic diagram illustrating the application, in an example scenario, of implementations of a method for determining feature words according to implementations of the present specification.

In some example scenarios, to avoid the interference by meaningless word segmentation units, further reduce the subsequent workload and improve processing efficiency, referring to FIG. 4, in specific implementations, before the determining, based on the word vectors of the word segmentation units and word vectors of the predetermined feature words, a word segmentation unit meeting the second predetermined threshold among the plurality of word segmentation units as the second feature word, the method can further include the following steps: filtering out word vectors of stop words from the word vectors of the word segmentation units to obtain the word vectors of the filtered word segmentation units; and then determining a word segmentation unit meeting the second predetermined threshold among the word vectors of the filtered word segmentation units.

In example scenarios, the above stop words can be understood as a phrase whose represented content has no practical meaning or is unrelated to the attribute type of transaction data. Specifically, the above stop words can be some conjunctions or auxiliary words, such as "的", "是", and "了", or can be some broad pronouns unrelated to transaction data, such as "我", "这" and "那", or can be numbers, letters or single words, etc. Certainly, it should be noted that stop words listed above are merely illustrative. In specific implementation, based on specific application scenarios, the above stop words can also include other words, such as "在", "有", "人" and "一". The specific content of the above stop words is not limited in the present specification.

It can be seen from example scenarios that in the method for determining feature words according to the present specification, a new word is extracted from the text data to obtain a first feature word; then the word segmentation library is updated by using the first feature word; and further, a new feature word is extracted from the text data as the second feature word by using the updated word segmentation library and the predetermined feature words, thereby avoiding inaccurate and incomplete feature word extraction caused by a word segmentation error during extraction of feature words, and achieving the technical effect of accurately identifying new feature words meeting requirements from the text data. The Chinese characters in the word segmentation unit are first split into a plurality of strokes to obtain a stroke vector of the word segmentation unit; then a word vector of the word segmentation unit is determined based on the stroke vector of the word segmentation unit and word vectors of context words, so that the obtained word vector of the word segmentation unit includes both contextual external information and Chinese character internal structure information, which can reflect richer and more accurate semantic information, and then the second feature word is extracted based on the word vector of the word segmentation unit, which improves the accuracy of determining the feature word. An unlabeled sample set is further established first based on a predetermined number of predetermined feature words extracted from the plurality of predetermined feature words and word segmentation units, and a labeled sample set is established based on the remaining predetermined feature words; and then, based on the unlabeled sample set and the labeled sample set, a more accurate fitting score threshold is determined through a plurality of iterative fittings, so that the second feature word can be determined from the word segmentation unit based on the above fitting score threshold, thereby further improving the accuracy of determining the feature word.

Figure 5:
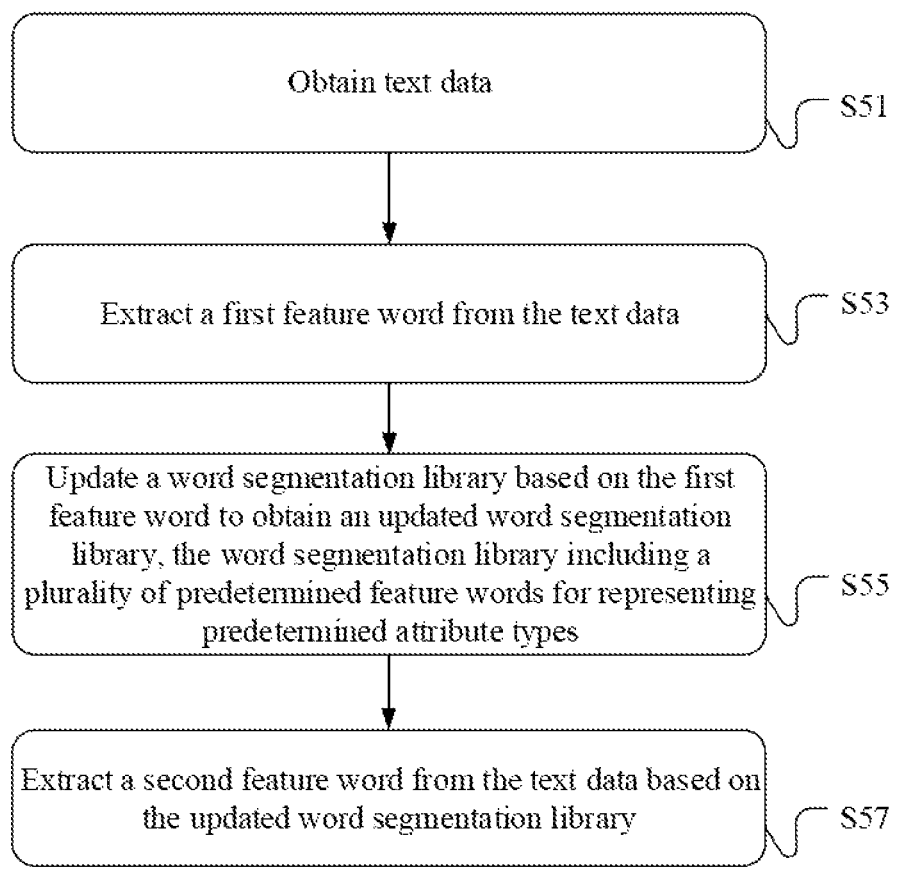
FIG. 5 is a schematic diagram illustrating implementations of the process of a method for determining feature words according to implementations of the present specification.

Referring to FIG. 5, implementations of the present specification provides a method for determining feature words, where the method is applied to the side of a backend server. In specific implementation, the method can include the following steps.

S51: Obtain Text Data.

In implementations, the above text data can be understood as data including information such as Chinese characters, English letters, Chinese phonetic symbols or numbers. Specifically, the above text data can include a transaction postscript, or can include a text label, etc. Certainly, the transaction postscript and text label listed above are only used for better describing the implementations of the present specification. In specific implementation, the above text data can also include other types or forms of data based on specific application scenarios and use requirements. This is not limited in the present specification.

The above transaction postscript can be understood as information data which is customized and edited by a transaction data initiator to describe relevant characteristics of the transaction data. Specifically, when sending transaction data, the transaction data initiator can input or set, through a predetermined text data input interface, feature information such as transaction purpose, transaction time or transaction object used to describe the transaction data as a transaction postscript. The above text label can be understood as a data label that is collected by the transaction network platform and is automatically generated, based on the operation related to the transaction data implemented by the transaction data initiator, to describe the type, purpose or content of the transaction data.

In implementations, the above obtaining text data can specifically include: the server collects data such as a transaction postscript and/or a text label on the transaction network platform within a predetermined time period (for example, nearly one month) as text data.

S53: Extract a First Feature Word from the Text Data.

In implementations, the above first feature word can be understood as a new word, e.g., a specific Chinese character combination that has not been identified by the server before and has not been recorded in a database or a word segmentation library of the server.

In implementations, in specific implementation, the server can analyze and process the above text data by using a new word discovery algorithm and extract the first feature word from the text data.

In implementations, the extracting the first feature word from the text data can include the following steps: selecting character strings with a character length less than a predetermined length threshold from the text data as candidate character strings; calculating index parameters of the candidate character strings; and extracting, based on the index parameters, a candidate character string meeting a first predetermined threshold from the candidate character strings as the first feature word.

In implementations, the character strings with a character length less than the predetermined length threshold are selected from the text data as candidate character strings, so that character strings which obviously do not conform to the habit of word formation and have a high probability of failing to form a phrase can be filtered out in advance, thereby avoiding the interference by the above types of character strings, reducing the workload and improving the processing efficiency.

In implementations, the above predetermined length threshold can be set to a length of 5 characters. Certainly, it should be noted that the predetermined length threshold listed above is merely illustrative. In specific implementation, other values can also be set as the above predetermined length thresholds based on specific conditions. This is not limited in the present specification.

In implementations, the above index parameter can be understood as a feature parameter for representing whether a character string can construct a phrase. Generally, if the index parameter of a candidate character string meets certain requirements, the character string can form a phrase, such as forming a new word.

In implementations, after the selecting character strings with a character length less than the predetermined length threshold from the text data as the candidate character strings and before the calculating the index parameters of the candidate character strings, the method further includes: filtering out, based on an existing database, character strings the same as those in the existing database from the above candidate character strings, and reserving candidate character strings that are not available in the existing database, so as to calculate the index parameters. As such, the character strings corresponding to existing phrases recorded in the existing database can be filtered out first, which reduces the workload of subsequent processing and improves the processing efficiency.

In implementations, the above index parameter can specifically include at least one of coagulation degree, information entropy, frequency, etc. Certainly, it should be noted that the index parameters listed above are only used for better describing the implementations of the present specification. In specific implementation, other types of feature parameters can also be used as the above index parameters based on specific conditions, for example, mutual information, tf-idf, and other word frequency information. This is not limited in the present specification.

The above coagulation degree can be understood as the probability that characters included in the character string in the text data are combined together. Generally, when a character string has a higher coagulation degree, the character string has a higher probability of becoming a phrase. The above information entropy can also be called degree of freedom, which can be understood as the probability of occurrence of certain specific information represented by a character string. Usually, when the probability of occurrence of certain specific information represented by a character string is high, it indicates that it has been propagated widely, or the degree of being quoted is relatively higher. The above frequency can be understood as the number of times a character string occurs in text data. Generally, when a character string has a higher frequency, the character string has a higher probability of becoming a phrase.

In implementations, the extracting, based on the index parameters, the candidate character string meeting the first predetermined threshold from the candidate character strings as the first feature word in specific implementations can include the following steps: comparing the coagulation degree, the information entropy and the frequency of each candidate character string with a predetermined coagulation degree threshold, a predetermined information entropy threshold and a predetermined frequency threshold, respectively; and determining, based on a comparison result, the candidate character string with the coagulation degree less than or equal to the predetermined coagulation degree threshold, the information entropy less than or equal to the predetermined information entropy threshold and/or the frequency less than or equal to the predetermined frequency threshold as the first feature character string meeting the first predetermined threshold, e.g., the new word.

In implementations, the specific values of the predetermined coagulation degree threshold, the predetermined information entropy threshold and the predetermined frequency threshold can be flexibly or dynamically set based on specific conditions and processing requirements. This is not limited in the present specification.

S55: Update a word segmentation library based on the first feature word to obtain an updated word segmentation library, the word segmentation library including a plurality of predetermined feature words for representing predetermined attribute types.

In implementations, the above word segmentation library can be understood as a word library established based on historical data and including a plurality of predetermined feature words for representing predetermined attribute types.

In implementations, the above predetermined attribute types can specifically include: legal types, illegal types, etc. The legal types can be further divided into repayment, consumption, lending and other types. Similarly, the illegal types can be further divided into many types.

In implementations, the above predetermined feature word can be understood as an existing phrase (or an existing word) that can be used to represent a predetermined attribute type. The predetermined feature word corresponds to the represented predetermined attribute type. For example, the predetermined feature words used to represent illegal types can also be referred to as black words.

In implementations, further considering that the applied transaction network platform is a transaction network platform using Chinese, and word segmentation is mainly performed on Chinese text data, jieba (a word segmentation library based on a hidden Markov model (HMM)) can be used as the above word segmentation library. Because jieba has good matching for Chinese character phrases, using jieba as the word segmentation library in implementations can make the subsequent word segmentation more accurate. Certainly, it should be noted that jieba listed above is merely illustrative. In specific implementation, other types of word segmentation libraries can be selected based on specific application scenarios and language types used. This is not limited in the present specification.

In implementations, the above updated word segmentation library is an expanded word segmentation library with a newly determined new word (e.g., a first feature word) added on the basis of the existing word segmentation library obtained based on historical data.

In implementations, the updating the word segmentation library based on the first feature word to obtain the updated word segmentation library in implementations can include: adding the determined first feature word to the existing word segmentation library, so as to update and expand the existing word segmentation library and obtain a more complete and accurate updated word segmentation library including currently newly identified new words. As such, when the above updated word segmentation library is used subsequently to replace the existing word segmentation library for word segmentation, it can solve the problem that incorrect splitting of some new words not recorded in the existing word segmentation library is caused due to the use of the existing word segmentation library.

S57: Extract a second feature word from the text data based on the updated word segmentation library.

In implementations, the above second feature word can be understood as a new phrase which is different from the predetermined feature word, has not been identified and determined before, and can represent the predetermined attribute type.

In implementations, the extracting the second feature word from the text data based on the updated word segmentation library in specific implementations can include the following steps: performing word segmentation on the text data based on the updated word segmentation library to obtain a plurality of word segmentation units; then respectively performing word vectorization on the plurality of word segmentation units to word vectorization units to obtain word vectors of the word segmentation units; and based on the word vectors of the word segmentation units and word vectors of the predetermined feature words, determining a word segmentation unit meeting a second threshold requirement among the plurality of word segmentation units as the second feature word.

It can be seen from the above that in the method for determining feature words according to implementations of the present specification, a new word is extracted from the text data to obtain a first feature word; then the word segmentation library is updated by using the first feature word; and further, a new feature word is extracted from the text data as the second feature word by using the updated word segmentation library and the predetermined feature words, thereby avoiding inaccurate and incomplete feature word extraction caused by a word segmentation error during extraction of feature words, and achieving the technical effect of accurately identifying new feature words meeting requirements from the text data.

In implementations, the above text data can specifically include: a transaction postscript, and/or a text label, etc. Certainly, it should be noted that the transaction postscript and text label listed above are only used for better describing the implementations of the present specification. In specific implementation, the above text data can also include other types or forms of data based on specific application scenarios and use requirements. This is not limited in the present specification.

In implementations, the extracting the first feature word from the text data in specific implementations can include the following steps: selecting character strings with a character length less than a predetermined length threshold from the text data as candidate character strings; calculating index parameters of the candidate character strings; and extracting, based on the index parameters, a candidate character string meeting a first predetermined threshold from the candidate character strings as the first feature word.

In implementations, the index parameter can specifically include at least one of coagulation degree, information entropy, frequency, etc. Certainly, it should be noted that the index parameters listed above are only used for better describing the implementations of the present specification. In specific implementation, other types of feature parameters can also be used as the above index parameters based on specific conditions. This is not limited in the present specification.

In implementations, before the selecting, from the text data, one or more character strings each with a character length less than the predetermined length threshold as one or more candidate character strings, the method in specific implementations can further include the following steps: filtering out invalid character strings from the text data.

In implementations, considering that the obtained text data may include a large number of meaningless character strings, which usually do not include Chinese characters or obviously do not form a phrase, in implementations, such character strings can be referred to as invalid character strings. Specifically, such a character string can be a character string composed entirely of letters, numbers or emoticons, or a web page link, or text data used to represent the transformation from traditional Chinese to simplified Chinese, etc.

In implementations, to protect the subsequent analysis and processing from interference by the above invalid character strings and improve processing efficiency, in specific implementation, before the selecting character strings with a character length less than the predetermined length threshold from the text data as the candidate character strings, the invalid character strings in the text data can be filtered out first to obtain filtered character strings, and subsequently the candidate character strings are determined based on the filtered character strings.

In implementations, the extracting the second feature word from the text data based on the updated word segmentation library in specific implementations can include the following steps: performing word segmentation on the text data based on the updated word segmentation library to obtain a plurality of word segmentation units; then respectively performing word vectorization on the plurality of word segmentation units to word vectorization units to obtain word vectors of the word segmentation units; and based on the word vectors of the word segmentation units and word vectors of the predetermined feature words, determining a word segmentation unit meeting a second predetermined threshold among the plurality of word segmentation units as the second feature word.

In implementations, the respectively performing word vectorization on the plurality of word segmentation units to word vectorization units to obtain word vectors of the word segmentation units can include the following steps: splitting the Chinese characters in the word segmentation unit into a plurality of strokes; establishing a stroke vector of the word segmentation unit based on the plurality of strokes of the word segmentation unit; obtaining words connected to the word segmentation unit from the text data as context words; obtaining word vectors of the context words; and determining the word vector of the word segmentation unit based on the stroke vector of the word segmentation unit and the word vectors of the context words.

In implementations, it is considered that most of the existing word vectorization algorithms (such as the PageRank method) are designed for the characteristics of English letters, while separate English letters can only express sounds but not meanings. However, in implementations, the word segmentation unit is mainly composed of Chinese characters. Chinese characters are different from English letters in expressing meaning in addition to pronunciation. That is, the internal structure of Chinese characters themselves can also reflect corresponding semantic information. If the word segmentation unit composed of Chinese characters is vectorized directly by, for example, the PageRank method, to obtain the word vector, the information included in the word vector often misses semantic information represented by the internal structure of Chinese characters in the word segmentation units, that is, the information is incomplete and inaccurate, which will affect the subsequent extraction of the second feature word.

In view of the above problems, to obtain more complete and accurate word vectors, in implementations, instead of directly using the existing PageRank algorithm for vectorization, based on the structural features of Chinese characters, stroke vectors of word segmentation units are established based on the strokes of Chinese characters in the word segmentation units, so as to represent semantic information included in the internal structure of the Chinese characters; based on words (such as left adjacent words and right adjacent words) connected to the word segmentation units in the text data, word vectors of the context words are obtained to represent contextual external information of the word segmentation units in the text data; the above two types of different word vectors are combined to obtain more accurate and complete word vectors of word segmentation units, so that the second feature word can be determined more accurately subsequently.

In implementations, in specific implementation, word vectorization can be respectively performed on the plurality of word segmentation units by using a Cw2vec algorithm to obtain word vectors of the word segmentation units.

In implementations, the determining, based on the word vectors of the word segmentation units and word vectors of the predetermined feature words, the word segmentation unit meeting the second predetermined threshold among the plurality of word segmentation units as the second feature word in specific implementations can include the following steps: extracting a predetermined number of predetermined feature words from a plurality of predetermined feature words as test words; established a labeled sample set based on the word vectors of the predetermined feature words except the test words in the plurality of predetermined feature words; established an unlabeled sample set based on the word vectors of the test words and the word vectors of the word segmentation units; determining a fitting score threshold through iterative fitting based on the labeled sample set and the unlabeled sample set; and determining, based on the fitting score threshold, the word segmentation unit meeting the second predetermined threshold among the word segmentation units as the second feature word.

In implementations, in specific implementation, a predetermined number of predetermined feature words can be extracted from a plurality of predetermined feature words as test words (also called spy); based on the word vectors of the predetermined feature words except the test words in the plurality of predetermined feature words, a labeled sample set (also called black samples, positive, denoted as p) is established, and the word vectors of word segmentation units in the sample set are marked as 1; based on the word vectors of the test words and the word vectors of the word segmentation units, an unlabeled sample set (which can also be called white samples, defined as unlabeled and denoted as U) is established, and the word vectors of the word segmentation units in the sample set are marked as 0. It should be noted that the number of samples in the above labeled sample set is less than that of samples in the unlabeled sample set.

After the above labeled sample set and unlabeled sample set are established, a fitting score threshold is determined through a plurality of iterative fittings based on the labeled sample set and the unlabeled sample set.

Specifically, the fitting score threshold can be determined as follows: performing gradient boosting decision tree (GBDT) fitting on the word vectors of word segmentation units in the labeled sample set and the unlabeled sample set, and scoring the word vector of each word segmentation unit based on fitting results (denoted as score); and processing the scores of the fitting results: setting the scores of the word vectors of the word segmentation units belonging to P to 1, keeping the original specific scores of the rest, and then performing normalization. The above steps are repeated many times (for example, twice) until a threshold (denoted as t) which enables the word vectors (e.g., spy) of the predetermined feature words classified in U and with a threshold ratio (for example, 90%) to be identified is found as the above fitting score threshold.

After the fitting score threshold is determined, the word segmentation unit corresponding to the word segmentation unit vector meeting the second predetermined threshold can be further determined among the word segmentation unit vectors as the second feature word based on the above fitting score threshold.

Specifically, the second feature word can be determined as follows: reclassifying the word vectors (e.g., spy) of the predetermined feature words classified in U back to P; then assigning the scores of word vectors of all remaining word segmentation units with fitting score values less than the fitting score threshold (e.g., t) in U to 0, assigning the scores of word vectors of all predetermined feature words in P to 1, keeping the current scores of the rest, and then performing normalization; then performing GBDT fitting on all word vectors, and scoring the word vector of each word again based on the fitting results to obtain a fitting score, which is recorded as score; based on the fitting score, setting the fitting score' of the word vector belonging to P to 1, keeping the original score' of the rest, and then performing normalization. The above steps are repeated many times (for example, 5 times) to obtain the final fitting score of each word vector, which is denoted as score", and the word segmentation unit corresponding to the word vector whose score" is greater than the feature word score threshold (denoted as v) is determined as the second feature word, e.g., a new phrase that can represent the attribute type and meets the second predetermined threshold. The above feature word score threshold can be set based on specific conditions and accuracy requirements. The specific value of the feature word score threshold is not limited in the present specification.

In implementations, in specific implementation, word vectors of the plurality of word segmentation units can also be analyzed and processed by using a PU_learning algorithm to determine a second feature word. This is not limited in the present specification.

In implementations, before the determining, based on the word vectors of the word segmentation units and word vectors of the predetermined feature words, the word segmentation unit meeting the second predetermined threshold among the plurality of word segmentation units as the second feature word, the method can further include the following steps: filtering out word vectors of stop words from the word vectors of the word segmentation units.

In implementations, the above stop words can be understood as phrases whose represented content has no practical significance or is unrelated to the attribute type of transaction data. Specifically, the above stop words can be some conjunctions or auxiliary words, such as "的", "是", and "了", or can be some broad pronouns unrelated to transaction data, such as "我", "这" and "那", or can be numbers, letters or single words, etc. Certainly, it should be noted that stop words listed above are merely illustrative. In specific implementation, based on specific application scenarios, the above stop words can also include other words, such as "在", "有", "人" and "一". The specific content of the above stop words is not limited in the present specification.

In implementations, before the determining, based on the word vectors of the word segmentation units and word vectors of the predetermined feature words, the word segmentation unit meeting the second predetermined threshold among the plurality of word segmentation units as the second feature word, the word vectors of the stop words are filtered out from the word vectors of the word segmentation units. This can avoid the occupation of time and resources when the word vectors of stop words are analyzed and processed subsequently, thereby reducing the workload and improving the processing efficiency.

It can be seen from the above that in the method for determining feature words according to implementations of the present specification, a new word is extracted from the text data to obtain a first feature word; then the word segmentation library is updated by using the first feature word; and further, a new feature word is extracted from the text data as the second feature word by using the updated word segmentation library and the predetermined feature words, thereby avoiding inaccurate and incomplete feature word extraction caused by a word segmentation error during extraction of feature words, and achieving the technical effect of accurately identifying new feature words meeting requirements from the text data. The Chinese characters in the word segmentation unit are first split into a plurality of strokes to obtain a stroke vector of the word segmentation unit; then a word vector of the word segmentation unit is determined based on the stroke vector of the word segmentation unit and word vectors of context words, so that the obtained word vector of the word segmentation unit includes both contextual external information and Chinese character internal structure information, which can reflect richer and more accurate semantic information, and then the second feature word is extracted based on the word vector of the word segmentation unit, which improves the accuracy of determining the feature word. An unlabeled sample set is further established first based on a predetermined number of predetermined feature words extracted from the plurality of predetermined feature words and word segmentation units, and a labeled sample set is established based on the remaining predetermined feature words; and then, based on the unlabeled sample set and the labeled sample set, a more accurate fitting score threshold is determined through a plurality of iterative fittings, so that the second feature word can be determined from the word segmentation unit based on the above fitting score threshold, thereby further improving the accuracy of determining the feature word.

Implementations of the present specification further provide a server, including a processor and a memory for storing instructions executable by the processor, where the processor can execute the instructions to perform the following steps: obtaining text data; extracting a first feature word from the text data; updating a word segmentation library based on the first feature word to obtain an updated word segmentation library, the word segmentation library including a plurality of predetermined feature words for representing predetermined attribute types; and extracting a second feature word from the text data based on the updated word segmentation library.

Figure 6:
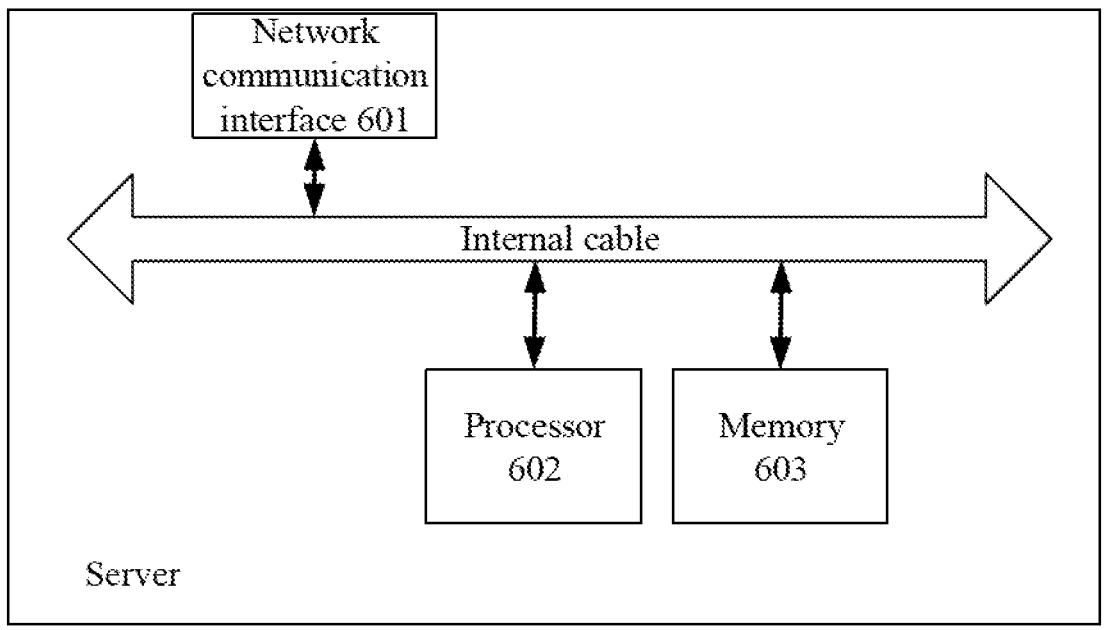
FIG. 6 is a schematic diagram illustrating implementations of the structure of a server according to implementations of the present specification.

To complete the above instructions more accurately, as shown in FIG. 6, the present specification further provides another specific server, where the server includes a network communication port 601, a processor 602 and a memory 603, and the above structures are connected through internal cables, so that the structures can perform specific data interaction.

The network communication port 601 can be specifically configured to obtain text data.

The processor 602 can be specifically configured to extract a first feature word from the text data; update a word segmentation library based on the first feature word to obtain an updated word segmentation library, the word segmentation library including a plurality of predetermined feature words for representing predetermined attribute types; and extract a second feature word from the text data based on the updated word segmentation library.

The memory 603 can be specifically configured to store text data and corresponding instruction programs input through the network communication port 601.

In implementations, the network communication port 601 can be a virtual port bound with different communication protocols to send or receive different data. For example, the network communication port can be port 80 for web data communication, or port 21 for FTP data communication, or port 25 for email data communication. In addition, the network communication port can also be a physical communication interface or a communication chip. For example, it can be a wireless mobile network communication chip, such as a GSM chip, or a CDMA chip; or can be a WiFi chip; or can be a Bluetooth chip.

In implementations, the processor 602 can be implemented in any suitable way. For example, the processor can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, a built-in microprocessor, etc. This is not limited in the present specification.

In implementations, the memory 603 can include a plurality of levels, and in a digital system, any device that can store binary data can be a memory; in an integrated circuit, a circuit with a memory function and without a physical form is also called a memory, such as an RAM and FIFO; and in a system, a physical storage device is also called a memory, such as a memory bank and a TF card.

Implementations of the present specification further provide a computer-readable storage medium based on the above method for determining feature words. The computer-readable storage medium stores computer program instructions, and when the computer program instructions are executed, the following is implemented: obtaining text data; extracting a first feature word from the text data; updating a word segmentation library based on the first feature word to obtain an updated word segmentation library, the word segmentation library including a plurality of predetermined feature words for representing predetermined attribute types; and extracting a second feature word from the text data based on the updated word segmentation library.

In implementations, the above storage medium includes but is not limited to a random access memory (RAM), a read-only memory (ROM), a cache, a hard disk drive (HDD) or a memory card. The memory can be configured to store computer program instructions. A network communication unit can be an interface set based on standards specified by a communication protocol and configured for network connection communication.

In implementations, the specific functions and effects of the program instructions stored in the computer storage medium can be explained by comparison with other implementations, which will not be described in detail herein.

Figure 7:
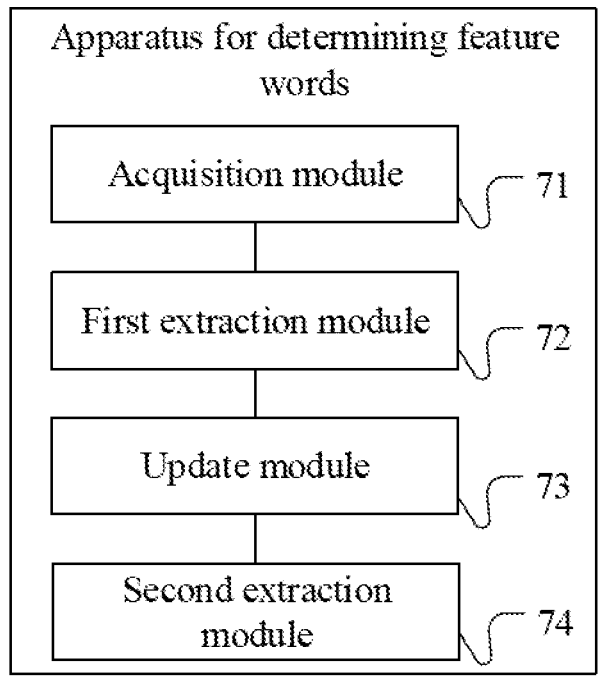
FIG. 7 is a schematic diagram illustrating implementations of the structure of an apparatus for determining feature words according to implementations of the present specification.

Referring to FIG. 7, on the software level, implementations of the present specification further provide an apparatus for determining feature words, where the apparatus can specifically include the following structure modules: an acquisition module 71, configured to obtain text data; a first extraction module 72, configured to extract a first feature word from the text data; an update module 73, configured to update a word segmentation library based on the first feature word to obtain an updated word segmentation library, the word segmentation library including a plurality of predetermined feature words for representing predetermined attribute types; and a second extraction module 74, configured to extract a second feature word from the text data based on the updated word segmentation library.

In implementations, the above text data can specifically include: a transaction postscript, and/or a text label, etc. Certainly, it should be noted that the text data listed above is merely illustrative. The specific type, form and content of text data are not limited in the present specification.

In implementations, the first extraction module 72 can specifically include the following structural units: a filter unit, configured to select, from the text data, one or more character strings each with a character length less than a predetermined length threshold as one or more candidate character strings; a calculation unit, configured to calculate an index parameter of each of the one or more candidate character strings; and an extraction unit, configured to determine, based on the index parameter, a candidate character string meeting a first predetermined threshold from the one or more candidate character strings as a first feature word.

In implementations, the index parameter can specifically include at least one of coagulation degree, information entropy, frequency, etc. Certainly, it should be noted that the index parameters listed above are merely illustrative. In specific implementation, other types of feature parameters can also be used as the above index parameters based on specific conditions and requirements. This is not limited in the present specification.

In implementations, the first extraction module 72 can specifically further include: a first filter unit, configured to filter out invalid character strings from the text data.

In implementations, the second extraction module 74 can specifically include the following structural units: a first processing unit, configured to perform word segmentation processing on the text data based on the updated word segmentation library to obtain a plurality of word segmentation units; a second processing unit, configured to respectively perform word vectorization on the plurality of word segmentation units to obtain word vectors of the word segmentation units; and a determining unit, configured to determine, based on the word vectors of the word segmentation units and word vectors of the predetermined feature words, a word segmentation unit meeting a second predetermined threshold among the plurality of word segmentation units as the second feature word.

In implementations, the second processing unit can specifically include the following structural subunits: a splitting subunit, configured to split a Chinese character in a word segmentation unit into a plurality of strokes; a first establishment subunit, configured to obtain a stroke vector of the word segmentation unit based on the plurality of strokes of the word segmentation unit; a first acquisition subunit, configured to obtain a word connected to the word segmentation unit from the text data as a context word; a second acquisition subunit, configured to obtain a word vector of the context word; and a third acquisition subunit, configured to determine a word vector of the word segmentation unit based on the stroke vector of the word segmentation unit and the word vector of the context word.

In implementations, the second processing unit can respectively perform word vectorization on the plurality of word segmentation units by using a Cw2vec algorithm to obtain word vectors of the word segmentation units.

In implementations, the determining unit can specifically include the following structural subunits: an extraction subunit, configured to extract a predetermined number of predetermined feature words from a plurality of predetermined feature words as test words; a second establishment subunit, configured to establish a labeled sample set based on word vectors of predetermined feature words of the plurality of predetermined feature words except for the test words; a third establishment subunit, configured to establish an unlabeled sample set based on the word vectors of the test words and the word vectors of the word segmentation units; a first determining subunit, configured to determine a fitting score threshold through iterative fitting based on the labeled sample set and the unlabeled sample set; and a second determining subunit, configured to determine, based on the fitting score threshold, the word segmentation unit meeting a second predetermined threshold among the word segmentation units as the second feature word.

In implementations, the second extraction module can specifically further include: a second filter unit, configured to filter out word vectors of stop words from the word vectors of the word segmentation units.

In implementations, the determining unit can analyze and process word vectors of the plurality of word segmentation units by using a PU_learning algorithm to determine a second feature word.

It should be noted that the units, apparatuses, modules, etc., illustrated in the above implementations can be implemented by computer chips or entities, or by products with certain functions. For ease of description, the above apparatus is divided into various functional modules. Certainly, in the implementations of the present specification, the functions of each module can be implemented in one or more pieces of software and/or hardware, and the module implementing the same function can also be implemented by a combination of a plurality of submodules or subunits. For example, the implementations of the apparatus described above are merely illustrative. For example, the division of the units is only a logical function division. In actual implementation, there may be another division way. For example, a plurality of units or components can be combined or integrated into another system, or some features can be ignored or not executed. In addition, the mutual coupling or direct coupling or communication connection shown or discussed may be an indirect coupling or communication connection through some interfaces, apparatuses or units, and can be in electrical, mechanical or other form.

It can be seen from the above that in the apparatus for determining feature words according to implementations of the present specification, a new word is extracted by a first extraction module from the text data to obtain a first feature word; then the word segmentation library is updated by an update module by using the first feature word; and further, a new feature word is extracted by a second extraction module from the text data as the second feature word by using the updated word segmentation library and the predetermined feature words, thereby avoiding inaccurate and incomplete feature word extraction caused by a word segmentation error during extraction of feature words, and achieving the technical effect of accurately identifying new feature words meeting requirements from the text data.

Although the present specification provides the operation steps of the method as described in the implementation or flowchart, more or fewer operation steps can be included based on conventional or non-inventive means. The step sequence listed in the implementation is only an example, and does not represent there is only one execution sequence. When actual apparatuses or client products are executed, they can be executed sequentially or in parallel based on the method shown in the implementation or the drawing (for example, in a parallel processor or multi-thread processing environment, or even in a distributed data processing environment). The term "comprise", "include", or any other variant thereof is intended to encompass a non-exclusive inclusion, so that a process, method, product, or device that includes a series of elements includes not only those elements, but also other elements not explicitly listed, or elements that are inherent to such a process, method, product, or device. If there are no more restrictions, it does not exclude that there are other identical or equivalent elements in the process, method, product, or device including the elements. The words such as "first" and "second" are used to indicate names, but do not indicate any particular order.

A person skilled in the art also know that, in addition to implementing a controller by using computer-readable program code, the method steps can be logically programmed, so that the controller implements the same functions in the form of a logic gate, a switch, an application-specific integrated circuit, a programmable logic controller, an embedded microcontroller, etc. Therefore, the controller can be regarded as a hardware component, and an apparatus included therein for implementing various functions can also be regarded as the structure within the hardware component. Or even, the apparatus for implementing various functions can be regarded as both a software module for implementing a method and the structure within the hardware component.

The present specification may be described in a general context of a computer executable instruction executed by a computer, for example, a program module. Generally, the program module includes routines, programs, objects, components, data structures, classes, etc., that perform specific tasks or implement specific abstract data types. The present specification can also be practiced in distributed computing environments where tasks are performed by remote processing devices connected through a communication network. In the distributed computing environments, program modules can be located in local and remote computer storage media including storage devices.

Through the description of the above implementations, a person skilled in the art can clearly understand that the present specification can be implemented by using software and a necessary general hardware platform. Based on such an understanding, the technical solutions of the present specification essentially or the part contributing to the existing technologies can be embodied in a form of a software product. The computer software product can be stored in a storage medium, such as an ROM/RAM, a magnetic disk or an optical disk, and includes several instructions for instructing a computer device (which can be a personal computer, a mobile terminal, a server, or a network device, etc.) to perform the methods described in the implementations of the present specification or in certain parts of the implementations of the present specification.

The implementations of the present specification are described in a progressive way. For same or similar parts of the implementations, references can be made to the implementations. Each implementation focuses on a difference from other implementations. This present specification can be used in many general-purpose or special-purpose computer system environments or configurations. Examples are a personal computer, a server computer, a handheld device or a portable device, a tablet device, a multiprocessor system, a microprocessor-based system, a set-top box, a programmable electronic device, a network PC, a minicomputer, a mainframe computers, a distributed computing environment including any of the above systems or devices, etc.

Although the present specification has been described with reference to implementations, a person of ordinary skill in the art know that there are many variations and changes to the present specification without departing from the spirit of the present specification, and the appended claims should include these variations and changes without departing from the spirit of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for determining feature words, comprising:
obtaining text data;
automatically extracting a first feature word from the text data;
updating a word segmentation library by including the first feature word as a determined feature word to obtain an updated word segmentation library, the word segmentation library including a first plurality of determined feature words for representing a plurality of attribute types before the updating, the first feature word being different from any one of the first plurality of determined feature words before the updating;
automatically extracting a second feature word from the same text data based on the updated word segmentation library that includes a second plurality of determined features words including the first feature word and the first plurality of determined feature words; and
classifying the text data based on the second feature word, wherein the extracting the first feature word from the text data includes:
selecting, from the text data, one or more character strings each having a character length less than a length threshold as one or more candidate character strings;
for each candidate character string of the one or more character strings,
calculating a first probability of the candidate character string occurring in the text data;
determining one or more split combinations of the candidate character string;
calculating a second probability of a split combination of the one or more split combinations occurring in the text data;
determining a coagulation degree of the candidate character string based on a ratio between the first probability and the second probability;
calculating an index parameter of each of the candidate character string, the index parameter including the coagulation degree, a higher value of the coagulation degree indicating a higher probability of the candidate character string being the first feature word; and
determining, based on the index parameter, a candidate character string meeting a first threshold from the one or more candidate character strings as the first feature word.

2. The method according to claim 1, wherein the text data includes one or more of a transaction postscript or a text label.

3. The method according to claim 1, wherein the index parameter includes a frequency.

4. The method according to claim 1, further comprising:
before the selecting, from the text data, the one or more character strings each having a character length less than the length threshold as one or more candidate character strings, filtering out invalid character strings from the text data.

5. The method according to claim 1, wherein the extracting the second feature word from the text data based on the updated word segmentation library includes:
performing word segmentation processing on the text data based on the updated word segmentation library to obtain a plurality of word segmentation units;

performing word vectorization processing on each of the plurality of word segmentation units to obtain word vectors of word segment units of the plurality of word segmentation units; and determining, based on the word vectors of the word segmentation units and word vectors of the plurality of determined feature words, a word segmentation unit meeting a second threshold among the plurality of word segmentation units as the second feature word.

6. The method according to claim 5, wherein the text data includes a Chinese character, and the performing word vectorization processing on each of the plurality of word segmentation units to obtain the word vectors of word segmentation units of the plurality of word segmentation units includes:

splitting the Chinese character in a word segmentation unit into a plurality of strokes;

obtaining a stroke vector of the word segmentation unit based on the plurality of strokes of the word segmentation unit;

obtaining a word connected to the word segmentation unit from the text data as a context word;

obtaining a word vector of the context word; and determining a word vector of the word segmentation unit based on the stroke vector of the word segmentation unit and the word vector of the context word.

7. The method according to claim 5, wherein the determining, based on the word vectors of the word segmentation units and word vectors of the plurality of determined feature words, the word segmentation unit meeting the second threshold among the plurality of word segmentation units as the second feature word includes:

extracting a determined number of determined feature words from the plurality of determined feature words as test words;

establishing a labeled sample set based on word vectors of determined feature words of the plurality of predetermined feature words except for the test words;

establishing an unlabeled sample set based on the word vectors of the test words and the word vectors of the word segmentation units;

determining a fitting score threshold through iterative fitting based on the labeled sample set and the unlabeled sample set; and determining, based on the fitting score threshold, a word segmentation unit meeting the second threshold among the word segmentation units as the second feature word.

8. The method according to claim 5, further comprising:

before the determining, based on the word vectors of the word segmentation units and word vectors of the plurality of determined feature words, the word segmentation unit meeting the second threshold among the plurality of word segmentation units as the second feature word, filtering out a word vector having an identified word from the word vectors of the word segmentation units.

9. A server, comprising a processor and a memory for storing instructions executable by the processor, wherein when executing the instructions the processor implements acts including:

obtaining text data;

automatically extracting a first feature word from the text data;

updating a word segmentation library by including the first feature word as a determined feature word to obtain an updated word segmentation library, the word segmentation library including a first plurality of determined feature words for representing a plurality of attribute types before the updating, the first feature being different from any one of the first plurality of determined feature work before the updating;

automatically extracting a second feature word from the same text data based on the updated word segmentation library that includes a second plurality of determined features words including the first feature word and the first plurality of determined feature words; and classifying the text data based on the second feature word, wherein the extracting the first feature word from the text data includes:

selecting, from the text data, one or more character strings each having a character length less than a length threshold as one or more candidate character strings;

for each candidate character string of the one or more character strings, calculating a first probability of the candidate character string occurring in the text data;

determining one or more split combinations of the candidate character string;

calculating a second probability of a split combination of the one or more split combinations occurring in the text data;

determining a coagulation degree of the candidate character string based on a ratio between the first probability and the second probability;

calculating an index parameter of each of the candidate character string, the index parameter including the coagulation degree, a higher value of the coagulation degree indicating a higher probability of the candidate character string being the first feature word; and determining, based on the index parameter, a candidate character string meeting a first threshold from the one or more candidate character strings as the first feature word.

10. The sever according to claim 9, wherein the text data includes one or more of a transaction postscript or a text label.

11. The sever according to claim 9, wherein the index parameter includes a frequency.

12. The sever according to claim 9, wherein the acts include:

before the selecting, from the text data, the one or more character strings each having a character length less than the length threshold as one or more candidate character strings, filtering out invalid character strings from the text data.

13. The sever according to claim 9, wherein the extracting the second feature word from the text data based on the updated word segmentation library includes:

performing word segmentation processing on the text data based on the updated word segmentation library to obtain a plurality of word segmentation units;

performing word vectorization processing on each of the plurality of word segmentation units to obtain word vectors of word segment units of the plurality of word segmentation units; and determining, based on the word vectors of the word segmentation units and word vectors of the plurality of determined feature words, a word segmentation unit meeting a second threshold among the plurality of word segmentation units as the second feature word.

14. The sever according to claim 13, wherein the text data includes a Chinese character, and the performing word vectorization processing on each of the plurality of word segmentation units to obtain the word vectors of word segmentation units of the plurality of word segmentation units includes:
    splitting the Chinese character in a word segmentation unit into a plurality of strokes;
    obtaining a stroke vector of the word segmentation unit based on the plurality of strokes of the word segmentation unit;
    obtaining a word connected to the word segmentation unit from the text data as a context word;
    obtaining a word vector of the context word; and
    determining a word vector of the word segmentation unit based on the stroke vector of the word segmentation unit and the word vector of the context word.

15. The sever according to claim 13, wherein the determining, based on the word vectors of the word segmentation units and word vectors of the plurality of determined feature words, the word segmentation unit meeting the second threshold among the plurality of word segmentation units as the second feature word includes:
    extracting a determined number of determined feature words from the plurality of determined feature words as test words;
    establishing a labeled sample set based on word vectors of determined feature words of the plurality of predetermined feature words except for the test words;
    establishing an unlabeled sample set based on the word vectors of the test words and the word vectors of the word segmentation units;
    determining a fitting score threshold through iterative fitting based on the labeled sample set and the unlabeled sample set; and
    determining, based on the fitting score threshold, a word segmentation unit meeting the second threshold among the word segmentation units as the second feature word.

16. The sever according to claim 13, wherein the acts include:
    before the determining, based on the word vectors of the word segmentation units and word vectors of the plurality of determined feature words, the word segmentation unit meeting the second threshold among the plurality of word segmentation units as the second feature word, filtering out a word vector having an identified word from the word vectors of the word segmentation units.

17. A non-transitory computer-readable storage medium storing computer instructions, which when executed by a processor, configures the processor to implement acts comprising:
    obtaining text data;
    automatically extracting a first feature word from the text data;
    updating a word segmentation library by including the first feature word as a determined feature word to obtain an updated word segmentation library, the word segmentation library including a first plurality of determined feature words for representing a plurality of attribute types before the updating, the first feature word being different from any one of the first plurality of determined feature words before the updating;
    automatically extracting a second feature word from the same text data based on the updated word segmentation library that includes a second plurality of determined features words including the first feature word and the first plurality of determined feature words; and
    classifying the text data based on the second feature word, wherein the extracting the first feature word from the text data includes:
        selecting, from the text data, one or more character strings each having a character length less than a length threshold as one or more candidate character strings;
        for each candidate character string of the one or more character strings,
            calculating a first probability of the candidate character string occurring in the text data;
            determining one or more split combinations of the candidate character string;
            calculating a second probability of a split combination of the one or more split combinations occurring in the text data;
            determining a coagulation degree of the candidate character string based on a ratio between the first probability and the second probability;
            calculating an index parameter of each of the candidate character string, the index parameter including the coagulation degree, a higher value of the coagulation degree indicating a higher probability of the candidate character string being the first feature word; and
        determining, based on the index parameter, a candidate character string meeting a first threshold from the one or more candidate character strings as the first feature word.

18. The non-transitory computer-readable storage medium according to claim 17, wherein the extracting the second feature word from the text data based on the updated word segmentation library includes:
    performing word segmentation processing on the text data based on the updated word segmentation library to obtain a plurality of word segmentation units;
    performing word vectorization processing on each of the plurality of word segmentation units to obtain word vectors of word segment units of the plurality of word segmentation units; and
    determining, based on the word vectors of the word segmentation units and word vectors of the plurality of determined feature words, a word segmentation unit meeting a second threshold among the plurality of word segmentation units as the second feature word.

19. The non-transitory computer-readable storage medium according to claim 17, wherein the index parameter includes a frequency.

20. The non-transitory computer-readable storage medium according to claim 17, wherein the acts include:
    before the selecting, from the text data, the one or more character strings each having a character length less than the length threshold as one or more candidate character strings, filtering out invalid character strings from the text data.

* * * * *